(12) United States Patent
Deniau et al.

(10) Patent No.: US 11,179,978 B2
(45) Date of Patent: Nov. 23, 2021

(54) REDUCED NUMBER OF STATES IN A TIRE PRESSURE MONITORING SYSTEM

(71) Applicant: Continental Automotive Systems, Inc., Auburn Hills, MI (US)

(72) Inventors: Jean-Christophe Deniau, Fenton, MI (US); Tomasz Jan Kaczmarski, Lake Forest, IL (US); Themi Anagnos, La Grange Park, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 159 days.

(21) Appl. No.: 16/718,803

(22) Filed: Dec. 18, 2019

(65) Prior Publication Data

US 2021/0188022 A1 Jun. 24, 2021

(51) Int. Cl.
*B60C 23/04* (2006.01)

(52) U.S. Cl.
CPC ...... *B60C 23/0474* (2013.01); *B60C 23/0486* (2013.01)

(58) Field of Classification Search
CPC ............ B60C 23/0474; B60C 23/0486; B60C 23/0462; B60C 23/0459; B60C 23/0454
See application file for complete search history.

(56) References Cited

U.S. PATENT DOCUMENTS

| | | | | |
|---|---|---|---|---|
| 2008/0024287 | A1* | 1/2008 | Boyle | B60C 23/0408 340/442 |
| 2009/0072959 | A1* | 3/2009 | Matsumura | B60C 23/0462 340/447 |
| 2011/0054728 | A1 | 3/2011 | Wagner | |
| 2011/0150141 | A1* | 6/2011 | Gauthier | H03L 7/1976 375/316 |
| 2020/0006988 | A1* | 1/2020 | Leabman | H02J 50/80 |

FOREIGN PATENT DOCUMENTS

| | | | |
|---|---|---|---|
| EP | 1013483 | A2 | 6/2000 |
| WO | 9606747 | A2 | 3/1996 |

OTHER PUBLICATIONS

International Search Report and the Written Opinion of the International Searching Authority dated Mar. 18, 2021 on for the counterpart PCT Application No. PCT/20120/070927.

* cited by examiner

*Primary Examiner* — Daryl C Pope

(57) ABSTRACT

At a control circuit of a TPM sensor, one or more of a first adjustment to the periodicity, a second adjustment to the content, and a third adjustment to the length of a message are determined based upon the operational history of the sensor. The adjustments are applied to the messages and adjusted messages are transmitted.

19 Claims, 4 Drawing Sheets

REDUCED NUMBER OF STATES IN A TIRE PRESSURE MONITORING SYSTEM

TECHNICAL FIELD

This application relates to the operation of a tire pressure monitoring system.

BACKGROUND OF THE INVENTION

Tire pressure monitoring sensors obtain the pressure of a tire. These devices might also obtain other information such as the temperature of the air in the tire. Once they obtain this information, it may be sent to a receiver in the vehicle. The receiver may analyze the tire pressure information and if the pressure is too low, may issue a warning to the driver of the vehicle.

BRIEF DESCRIPTION OF THE DRAWINGS

For a more complete understanding of the disclosure, reference should be made to the following detailed description and accompanying drawings wherein.

Figure 1:
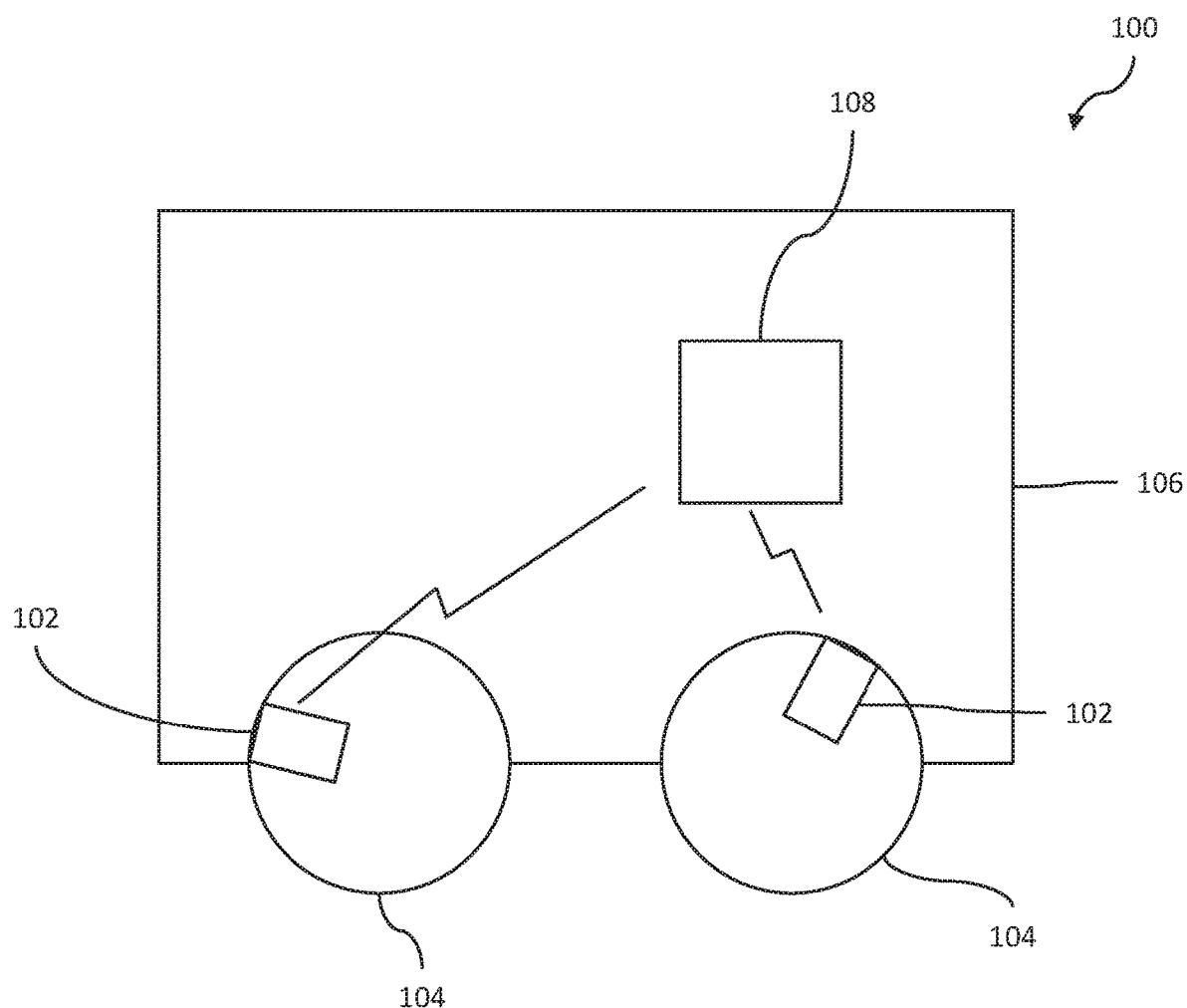
FIG. 1 comprises a block diagram of a tire pressure monitoring (TPM) system according to various embodiments of the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Approaches are described herein that adjust characteristics of transmissions or messages transmitted from TPM sensors. The transmissions may be adjusted, in examples, in terms of periodicity, content, and/or length. Adjustments of other characteristics of the transmissions are also possible. In aspects, the adjustments are made based upon an analysis by the TPM sensor of historical operational patterns of the sensor. By adjusting the characteristics of the transmissions based upon the operational patterns of the sensor, the sensor is operated more efficiently and effectively.

In many of these embodiments, a tire pressure monitoring (TPM) sensor includes a measurement device, a transmitter device, an electronic memory, at least one sensing device, and a control circuit. The measurement device is configured to measure tire pressure at a tire associated with the TPM sensor. The electronic memory stores an operational history of the TPM sensor, and the operational history comprises information concerning operational patterns of the TPM sensor over at least one previous time period. The operational patterns are detected by the at least one sensing device. The transmitter device transmits a first message at a first time according to a periodicity, a content, and a length.

The control circuit is coupled to the measurement device, the transmitter device, the at least one sensing device, and the electronic memory. The control circuit is configured to retrieve the operational history from the electronic memory and selectively determine one or more of a first adjustment to the periodicity, a second adjustment to the content, and a third adjustment to the length based upon the operational history. The control circuit is further configured to selectively apply the first adjustment to the periodicity to produce an adjusted periodicity, the second adjustment to the content or produce an adjusted content, and/or the third adjustment to the length to produce an adjusted length. At a second time subsequent to the first time, the control circuit is configured to form and transmit via the transmitter device a second message according to one or more of the adjusted periodicity, the adjusted content, and the adjusted length.

In aspects, the content of the first message is the tire pressure. In examples, the operational patterns are detected by the at least one sensing device and relate to one or more of temperature patterns, wheel rotation patterns, gravity change patterns, and changes in power patterns. Other examples are possible.

In other aspects, the control circuit is further configured to prevent applying the first adjustment, the second adjustments and the third adjustment when a pressure drop of the tire pressure above a threshold is detected.

In other examples, the at least one sensing device comprises an accelerometer, and the accelerometer is configured to detect changes in gravity. In yet other examples, the at least one sensing device comprises an accelerometer, and when the tire pressure as measured by the measurement device is zero and the accelerometer indicates a gravity (or changes in gravity) that varies beyond a threshold, the control circuit causes transmissions from the transmitter device to be halted. In yet other examples, the at least one sensing device comprises an accelerometer, and when the tire pressure as measured by the measurement device is zero and the accelerometer indicates a gravity (or gravity change) that does not vary beyond a threshold over time, the control circuit causes transmissions from the transmitter device to be increased from a first number to a second number.

In still other examples, the first adjustment, the second adjustment, and the third adjustment are determined periodically at predetermined times.

In other aspects, the at least one sensing device comprises a temperature sensor, the temperature sensor measuring temperature of the tire. Other examples are possible.

In still other examples, the sensor further comprises a battery. In addition, the at least one sensing device comprises a power detector.

In others of these embodiments, tire pressure is measured at a tire associated with a TPM sensor. A first message is transmitted from the sensor at a first time according to a periodicity, a content, and a length. At an electronic memory at the TPM sensor an operational history of the TPM sensor is stored. The operational history comprises information concerning operational patterns of the TPM sensor over at least one previous time period and the operational patterns can be detected by at least one sensing device.

At a control circuit of the sensor, the operational history is retrieved from the electronic memory. One or more of a first adjustment to the periodicity, a second adjustment to the content, and a third adjustment to the length are selectively determined based upon the operational history. The first adjustment to the periodicity is applied to produce an adjusted periodicity, the second adjustment is applied to the content to produce an adjusted content, and the third adjustment is applied to the length to produce an adjusted length.

At a second time subsequent to the first time, a second message is formed and transmitted from the TPM sensor. The second message is transmitted according to one or more of the adjusted periodicity, the adjusted content, and/or the adjusted length.

In still others of these embodiments, a non-transitory computer usable medium has a computer readable program code embodied therein. The computer readable program code adopted to be executed to implement a method of operating a tire pressure monitoring sensor. The method comprises: measuring tire pressure at a tire associated with a TPM sensor; transmitting a first message from the sensor at a first time according to a periodicity, a content, and a length; storing at an electronic memory at the TPM sensor an operational history of the TPM sensor, the operational history comprising information concerning operational patterns of the TPM sensor over at least one previous time period, wherein the patterns are detected by at least one sensing device. At a control circuit of the sensor the method includes retrieving the operational history from the electronic memory; selectively determining one or more of a first adjustment to the periodicity, a second adjustment to the content, and a third adjustment to the length based upon the operational history; applying the first adjustment to the periodicity to produce an adjusted periodicity, the second adjustment to the content to produce an adjusted content, and the third adjustment to the length to produce an adjusted length; and at a second time subsequent to the first time, forming and transmitting from the TPM sensor a second message according to one or more of the adjusted periodicity, the adjusted content, and the adjusted length.

Referring now to FIG. 1, one example of a tire pressure monitoring system 100 is described. The system 100 includes tire pressure monitoring (TPM) sensors 102, which are disposed in or at tires 104 of a vehicle 106. The sensor 102 communicates with a vehicle control unit (or receiver) 108 in the vehicle 106. It will be appreciated that the vehicle control unit 108 in the vehicle 106 is disposed at a fixed location in the vehicle 106 and, in one aspect, is not portable.

The TPM sensor 102 may include devices or components that measure the tire pressure, temperature, or other operating characteristics of the tires 104. Once measured by a particular one of the sensors 102, the tire pressure for a particular tire is sent to the vehicle control unit 108. In these regards, the TPM sensor 102 includes a control circuit, a pressure measurement device, and a transmitter/receiver (or simply a transmitter). The sensor 102 may be powered by a battery (or other power source).

The pressure measurement device of each sensor 102 measures the pressure of the tires 102. The transmitter/receiver of each sensor 102 transmits pressure measurements to the vehicle control unit 108 according to one or more protocols or formats. Protocols or formats refer to transmission frequencies, baud rates, data formats, and any other type of parameter that describes a transmission. A particular protocol may relate, be specified by, or be associated with a particular automobile manufacturer.

The TPM sensor 102 may transmit bursts of the same information, but according to a plurality of protocols. In one example, each of the plurality of protocols may relate to a different automobile manufacturer.

Additionally, the TPM sensor 102 may also receive information from a programming tool that is sufficient to program the TPM sensor 102 to operate according to a predetermined approach. Further, other sensors (e.g., temperature sensors) may be associated with the TPM sensor 102.

As described in greater detail below, a first message or transmission is transmitted from the sensor 102 at a first time according to a periodicity, a content, and a length. At a control circuit of the sensor 102, the operational history is retrieved from the electronic memory of the sensor 102. One or more of a first adjustment to the periodicity, a second adjustment to the content, and a third adjustment to the length are selectively determined by the control circuit of the sensor 102 based upon the operational history. The first adjustment to the periodicity is applied to produce an adjusted periodicity, the second adjustment is applied to the content to produce an adjusted content, and/or the third adjustment is applied to the length to produce an adjusted length. As mentioned, messages may be referred to as "bursts" and the bursts include pressure (or other data) that is configured according to the format of one or more automobile or vehicle manufacturers. In other words, each manufacturer may have a different format to transmit the information (e.g., a bust may include pressure information for manufacturer A (in format A), manufacturer B (in format B), and manufacturer C (in format C)). By periodicity, it is meant how often a particular message or the bursts are transmitted.

At a second time subsequent to the first time, a second message is formed and transmitted from the TPM sensor 102 by the transmitter/receiver if the sensor. The second message is transmitted according to one or more of the adjusted periodicity, the adjusted content, and/or the adjusted length.

Figure 2:
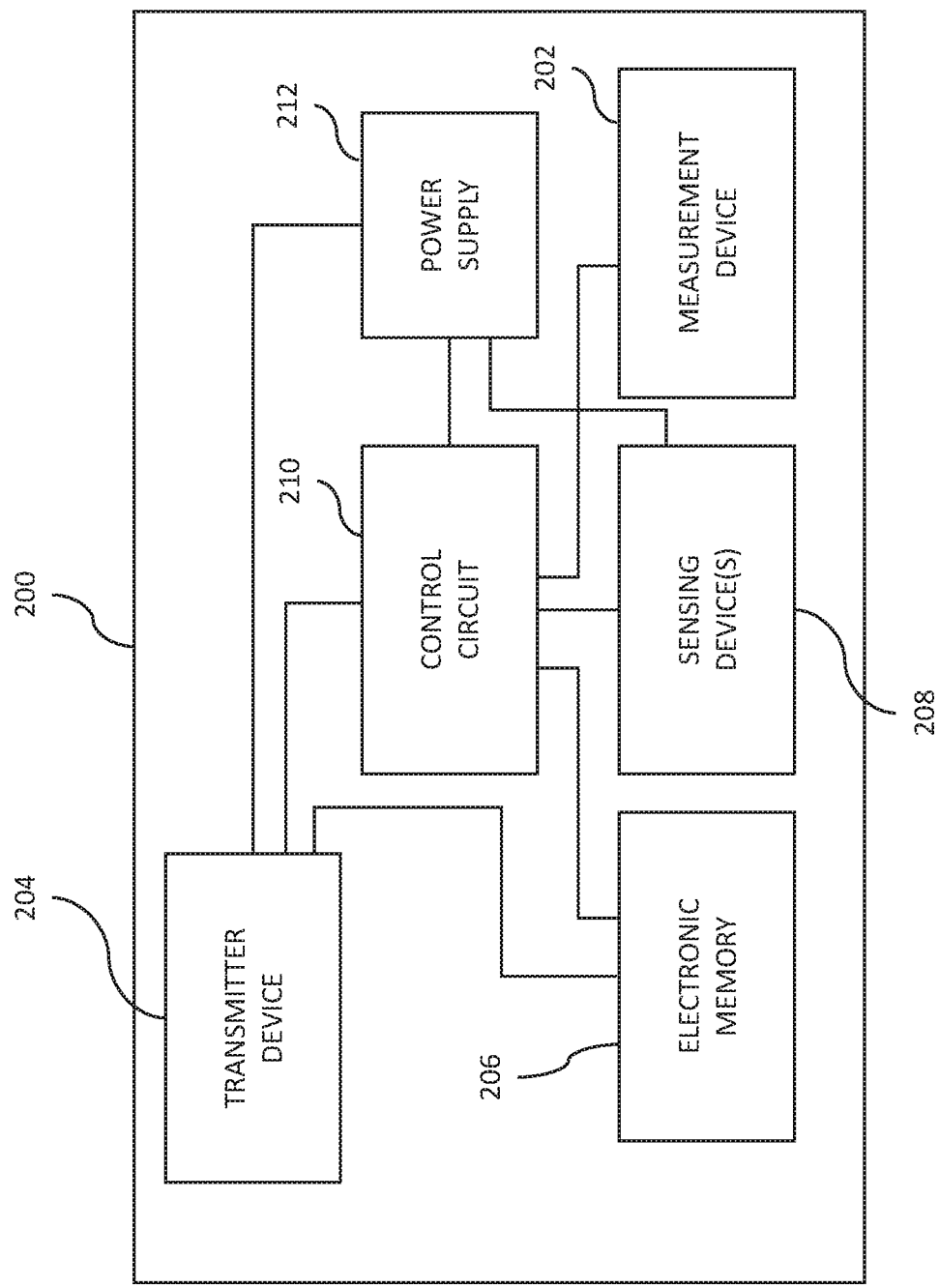
FIG. 2 comprises a flowchart of an approach for operating a TPM sensor according to various embodiments of the present invention.

Referring now to FIG. 2, one example of a TPM sensor 200 is described. The TPM sensor includes a measurement device 202, a transmitter device 204, an electronic memory 206, a sensing device 208, a control circuit 210, and a power supply 212.

The measurement device 202 is configured to measure tire pressure at a tire associated with the TPM sensor. In these regards, the measurement device 202 includes all mechanical or non-mechanical elements to obtain and measure a pressure in the tire at which the TPM sensor 200 is deployed.

The transmitter device 204 is any transmitting device that transmits messages from the TPM sensor 200. The transmitter device 204 includes all electronic and non-electronic elements to accomplish this function such as an antenna, wherein the transmitter device transmits a first message at a first time according to a periodicity, a content, and a length. A transmission buffer may also be included. Additionally, the transmitter device 204 may also include a receiver that is configured to receive messages from external sources. In one example, these messages from external sources are used to program the sensor 200. Other examples are possible.

The electronic memory 206 is any type of electronic memory storage device (e.g., RAM, ROM, EEPROM, to mention a few examples). The electronic memory 206 stores an operational history of the TPM sensor. The operational history comprises information concerning operational patterns of the TPM sensor over at least one previous time period.

Operational patterns may include, as examples, temperature patterns, wheel rotation patterns, gravity change patterns, and changes in power patterns. For example, temperature patterns may include minimum and maximum and maximum temperatures observed, average temperatures, and temperature spikes over a predetermined time period.

Rotational patterns may include rotational speeds, distance travelled, and/or direction. Gravity changes may include average gravity measurements, magnitude, and direction. Power usage or power level patterns, may involve battery (or other power supply) amount of charge, rate of use, and correlate with specific times (e.g., when did battery power drop by a certain percentage). Other operational patterns are possible. It will also be appreciated that combinations of characteristics may be stored and these characteristics may be cross-correlated with each other (e.g., temperature patterns may be correlated over time with power patterns). Additionally, it will be understood that the operational patterns may be stored in any type of data structure or data structures.

The sensing device 208 is any device that can sense operational characteristics of the TPM sensor 200. The sensing device 208 is configured to detect the operational patterns. The sensing device 208 may be a thermometer, an accelerometer, or a power measurement device. Although one sensing device is shown in this example, it will be appreciated that more than one sensing device can be used (e.g., a thermometer, an accelerometer, and a power measurement device can all be used).

The power supply 212 may be any power source such as a battery that powers the various elements of the TPM sensor 200.

The control circuit 210 is coupled to the measurement device, the transmitter device, the at least one sensing device, and the electronic memory. It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 210 may be configured (for example, by using corresponding programming stored in a memory as will be well understood by those skilled in the art) to carry out one or more of the steps, actions, and/or functions described herein.

The control circuit 210 is configured to receive the information from the sensing device 208, ascertain patterns, store the patterns as the operational history in the electronic memory 206.

The control circuit 210 is configured to retrieve the operational history from the electronic memory 206. The control circuit 210 is further configured to selectively determine a first adjustment to the periodicity, a second adjustment to the content, and a third adjustment to the length based upon the operational history.

The control circuit 210 is configured to selectively apply one or more of the first adjustment to the periodicity to produce an adjusted periodicity, the second adjustment to the content or produce an adjusted content, and the third adjustment to the length to produce an adjusted length; The control circuit 210 is configured, at a second time subsequent to the first time, form and transmit via the transmitter device a second message according to the adjusted periodicity, the adjusted content, and the adjusted length.

Figure 3:
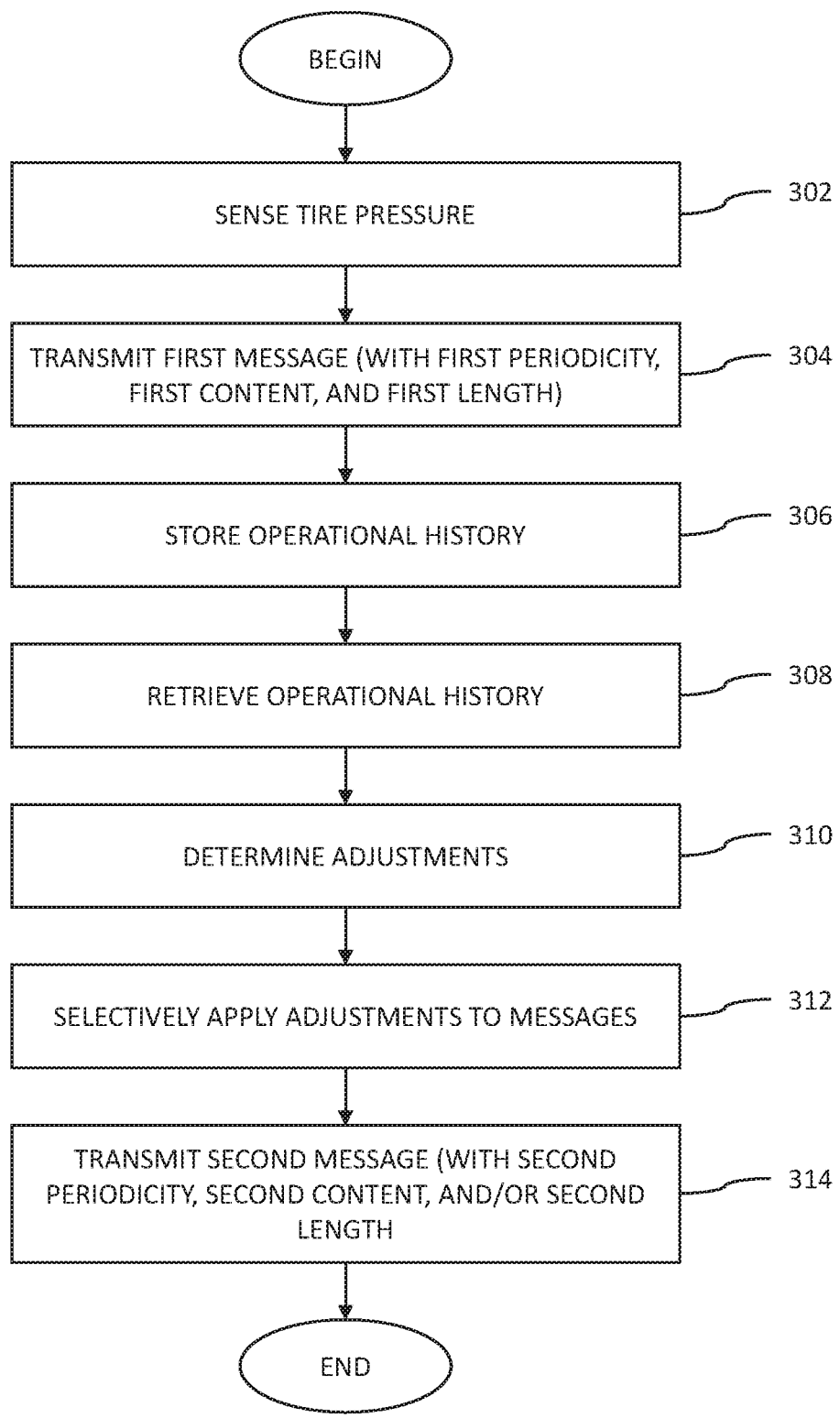
FIG. 3 comprises a flowchart of an approach for operating a TPM sensor according to various embodiments of the present invention.

Referring now to FIG. 3, an approach for operating a TPM sensor is described. At step 302, tire pressure is measured at a tire associated with a TPM sensor. The sensor may include measurement devices that sense the pressure in the tire.

At step 304, a first message is transmitted from the sensor at a first time according to a periodicity, a content, and a length. Periodicity refers to how often a message is transmitted (e.g., every minute, once a day, etc.) The content refers to the informational content of the message. The length refers to the length of the message.

At step 306 and at an electronic memory at the TPM sensor an operational history of the TPM sensor is stored. The operational history comprises information concerning operational patterns of the TPM sensor over at least one previous time period and the operational patterns can be detected by at least one sensing device. For example, the average temperature of the sensor over time (or the temperature of the air in the tire over time) may be shown. The information forms a history of the conditions of the tire. How parameters changed and when this changed is shown.

Operational patterns may be sensed by a sensing device at the sensor and recorded. For example, an accelerometer can record changes in gravity. A control circuit in the sensor receives the measured information and processes this information. In aspects, processing the information includes storing the information in a data structure. In one example, measured acceleration can be stored in a table that correlates acceleration values to points in time. The control circuit can also determine other data such as average values, median values, or trends over time. Further, the control circuit can create and populate data structures that correlate different types of characteristics. For example, sensor temperature and tire pressure can be correlated, pressure and acceleration can be corelated, and/or battery power and temperature can be correlated.

At step 308 and at a control circuit of the sensor, the operational history is retrieved from the electronic memory. The history may be in any data format and contained in one or more data structures.

At step 310, a first adjustment to the periodicity, a second adjustment to the content, and a third adjustment to the length are selectively determined based upon the operational history. In one example, the sensor may determine that the battery voltage is trending downward (and has fallen below a threshold) and the temperature of the sensor or the air in the tire has fallen below a level a temperature threshold for a predetermined amount of time.

At step 312, the first adjustment to the periodicity is applied to produce an adjusted periodicity, the second adjustment is applied to the content to produce an adjusted content, and the third adjustment is applied to the length to produce an adjusted length. For example, given the example of step 310, the periodicity may be reduced to transmit from every one minute to every day, the content may be changed to omit some fields, and the length of the message is shortened.

At step 314 and at a second time subsequent to the first time, a second message is formed and transmitted from the TPM sensor. The second message is transmitted according to the adjusted periodicity, the adjusted content, and/or the adjusted length.

Figure 4:
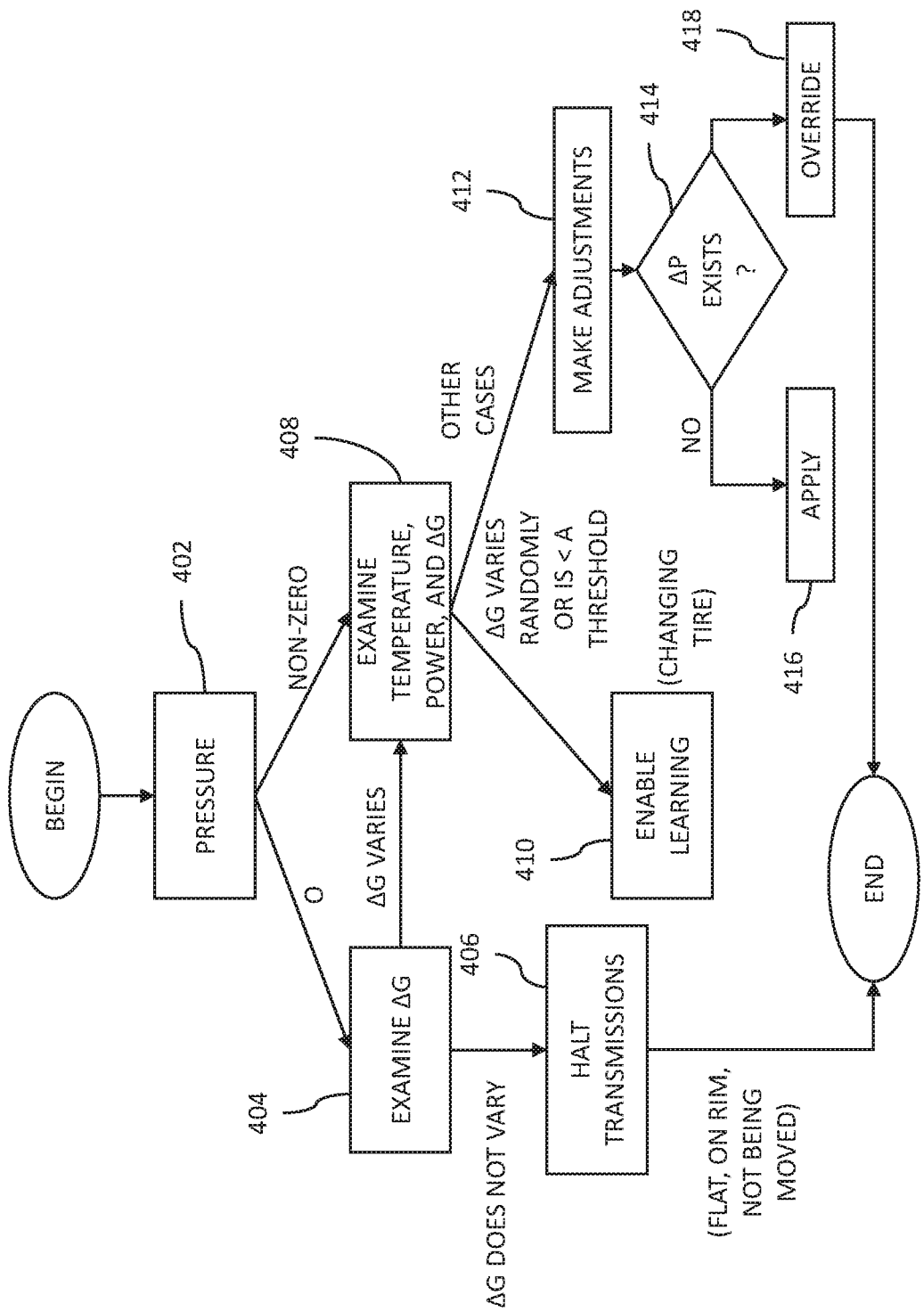
FIG. 4 comprises a flowchart of an approach for operating a TPM sensor according to various embodiments of the present invention.

Referring now to FIG. 4, one example of determining adjustments to transmissions is described. It will be appreciated that this is only one example of an approach and that other examples are possible. This approach uses operational patterns that have been stored in an electronic memory. This approach may be periodically performed or performed at certain defined times.

At step 402, the pressure as measure in the tire by a pressure sending device is analyzed. The pressure may be 0 or very close to zero (e.g., within a small predetermined amount of 0, for example, 1% of full tire pressure). Alternatively, the pressure may be above 0 or essentially above 0 (e.g., above a small predetermined amount of 0, for example, at or above 1% of full tire pressure).

If the pressure is 0, then step 404 is executed. If the pressure is non-zero, then step 408 is executed. At step 404, a determination is made to see if a gravity varies by consulting the operational patterns. If the gravity does not vary, the conclusion may be made that the tire is flat, is on the tire rim of a vehicle, and is not being moved. Consequently, at step 408 transmissions are halted to conserve battery life. If the determination is that gravity over time is constant or nearly constant (e.g., within a predetermined threshold), execution continues at step 408.

At step 408, the gravity, temperature, and power patterns are examined. If the change in gravity varies randomly or is below a threshold, then it can be concluded that the tire is being changed or moved from one vehicle to another vehicle. If this is the case, then at step 410 the sensor is enabled for learning. That is, the sensor undergoes a registration process whereby its presence is learned by a control unit (receiver) in a vehicle. LF signals can be used for this purpose.

For all other cases, step 412 is executed. At step 412, adjustments to the periodicity, length, and/or content of transmissions made by the sensor are determined. This adjustments are made by examining the temperature and the power. For example, when the temperature is below a first threshold and the power is below a second threshold, then the periodicity of transmissions (how often transmissions of the same message are sent/repeated) may be reduced to reduce power consumption.

Next, at step 414 it is determined if there has been a pressure drop (represented by ΔP and whether this drop is above a predetermined threshold). If the answer is negative, at step 416, the adjustments are applied to the sensor. If the answer is affirmative, and the determination to make adjustments is overwritten and the adjustments are not made. It will be appreciated that steps 414, 416, and 418 can also be performed after steps 406 and 410 are executed.

In some examples, transmissions made by the sensor can alter the content. These transmissions may be made to a receiver or control unit in the vehicle. the content of the message (e.g., as altered at step 412 or as included in a special or last transmission from the sensor before step 406 is executed) may include a message that can be rendered to a user (e.g., the battery is at low power). The receiver/vehicle control unit can perform other actions such as controlling other equipment in the vehicle or informing other users in other vehicles (or users at home) of potential safety issues. Other examples of actions are possible.

It should be understood that any of the devices described herein (e.g., the control circuits, the receivers, the transmitters, the sensors, any presentation or display devices, or the external devices) may use a computing device to implement various functionality and operation of these devices. In terms of hardware architecture, such a computing device can include but is not limited to a processor, a memory, and one or more input and/or output (I/O) device interface(s) that are communicatively coupled via a local interface. The local interface can include, for example but not limited to, one or more buses and/or other wired or wireless connections. The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory devices described herein can include any one or combination of volatile memory elements (e.g., random access memory (RAM), such as dynamic RAM (DRAM), static RAM (SRAM), synchronous dynamic RAM (SDRAM), video RAM (VRAM), and so forth)) and/or nonvolatile memory elements (e.g., read only memory (ROM), hard drive, tape, CD-ROM, and so forth). Moreover, the memory may incorporate electronic, magnetic, optical, and/or other types of storage media. The memory can also have a distributed architecture, where various components are situated remotely from one another, but can be accessed by the processor.

The software in any of the memory devices described herein may include one or more separate programs, each of which includes an ordered listing of executable instructions for implementing the functions described herein. When constructed as a source program, the program is translated via a compiler, assembler, interpreter, or the like, which may or may not be included within the memory.

It will be appreciated that any of the approaches described herein can be implemented at least in part as computer instructions stored on a non-volatile computer media (e.g., a computer memory as described above) and these instructions can be executed on a processing device such as a microprocessor. However, these approaches can be implemented as any combination of electronic hardware and/or software.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A tire pressure monitoring (TPM) sensor, the sensor comprising:
   a measurement device for measuring tire pressure at a tire associated with the TPM sensor;
   a transmitter device, wherein the transmitter device transmits a first message at a first time according to a periodicity, a content, and a length;
   an electronic memory, the electronic memory storing an operational history of the TPM sensor, the operational history comprising information concerning operational patterns of the TPM sensor over at least one previous time period;
   at least one sensing device that is configured to detect the operational patterns;
   a control circuit, the control circuit coupled to the measurement device, the transmitter device, the at least one sensing device, and the electronic memory, the control circuit configured to:
   retrieve the operational history from the electronic memory;
   selectively determine one or more of a first adjustment to the periodicity, a second adjustment to the content, and a third adjustment to the length based upon the operational history;
   selectively apply one or more of the first adjustment to the periodicity to produce an adjusted periodicity, the second adjustment to the content or produce an adjusted content, and the third adjustment to the length to produce an adjusted length;
   at a second time subsequent to the first time, form and transmit via the transmitter device a second message according to the adjusted periodicity, the adjusted content, and the adjusted length.

2. The sensor of claim 1, wherein the content of the first message is the tire pressure.

3. The sensor of claim 1, wherein the operational patterns that are detected by the at least one sensing device and relate to one or more of: temperature patterns, wheel rotation patterns, gravity change patterns, and changes in power patterns.

4. The sensor of claim 1, wherein the control circuit is further configured to prevent applying the first adjustment, the second adjustments and the third adjustment when a pressure drop of the tire pressure above a threshold is detected.

5. The sensor of claim 1, wherein the at least one sensing device comprises an accelerometer, the accelerometer configured to detect changes in gravity.

6. The sensor of claim 1, wherein the first adjustment, the second adjustment, and the third adjustment are determined periodically at predetermined times.

7. The sensor of claim 1, wherein the at least one sensing device comprises a temperature sensor, the temperature sensor measuring temperature of the tire.

8. The sensor of claim 1, wherein the at least one sensing device comprises an accelerometer, and when the tire pressure as measured by the measurement device is zero and the accelerometer indicates a gravity that varies beyond a threshold, the control circuit causes transmissions from the transmitter device to be halted.

9. The sensor of claim 1, wherein the at least one sensing device comprises an accelerometer, and when the tire pressure as measured by the measurement device is zero and the accelerometer indicates a gravity that does not vary beyond a threshold over time, the control circuit causes transmissions from the transmitter device to be increased from a first number to a second number.

10. The sensor of claim 1, further comprising a battery, and wherein the at least one sensing device comprises a power detector.

11. A method of operating a tire pressure monitoring (TPM) sensor, the method comprising:
    measuring tire pressure at a tire associated with a TPM sensor;
    transmitting a first message from the sensor at a first time according to a periodicity, a content, and a length;
    storing at an electronic memory at the TPM sensor an operational history of the TPM sensor, the operational history comprising information concerning operational patterns of the TPM sensor over at least one previous time period, the operational patterns detected by at least one sensing device;
    at a control circuit of the sensor:
    retrieving the operational history from the electronic memory;
    selectively determining one or more of a first adjustment to the periodicity, a second adjustment to the content, and a third adjustment to the length based upon the operational history;
    applying one or more of the first adjustment to the periodicity to produce an adjusted periodicity, the second adjustment to the content to produce an adjusted content, and the third adjustment to the length to produce an adjusted length;
    at a second time subsequent to the first time, forming and transmitting from the TPM sensor a second message according to the adjusted periodicity, the adjusted content, and the adjusted length.

12. The method of claim 11, wherein the content of the first message is the tire pressure.

13. The method of claim 11, wherein the operational patterns that are detected by a sensing device at the sensor and relate to one or more of: temperature patterns, wheel rotation patterns, gravity change patterns, and changes in power patterns.

14. The method of claim 11, wherein the control circuit is further configured to prevent applying the first adjustment, the second adjustments and the third adjustment when a pressure drop of the tire pressure above a threshold is detected.

15. The method of claim 11, wherein the first adjustment, the second adjustment, and the third adjustment are determined periodically at predetermined times.

16. The method of claim 11, further comprising measuring the gravity at the tire, and when the tire pressure is zero and the gravity varies over time beyond a threshold, the control circuit causes transmissions from the sensor to be halted.

17. The method of claim 11, further comprising measuring the gravity at the tire, and wherein when the tire pressure is zero and the gravity does not vary beyond a threshold over time, the control circuit causes transmissions from the sensor to be increased from a first number to a second number.

18. A non-transitory computer usable medium having a computer readable program code embodied therein, the computer readable program code adopted to be executed to implement a method of operating a tire pressure monitoring sensor, the method comprising:
    measuring tire pressure at a tire associated with a TPM sensor;
    transmitting a first message from the sensor at a first time according to a periodicity, a content, and a length;
    storing at an electronic memory at the TPM sensor an operational history of the TPM sensor, the operational history comprising information concerning operational patterns of the TPM sensor over at least one previous time period, the operational patterns being detected by at least one sensing device;
    at a control circuit of the sensor:
    retrieving the operational history from the electronic memory;
    selectively determining one or more of a first adjustment to the periodicity, a second adjustment to the content, and a third adjustment to the length based upon the operational history;
    applying one or more of the first adjustment to the periodicity to produce an adjusted periodicity, the second adjustment to the content to produce an adjusted content, and the third adjustment to the length to produce an adjusted length;
    at a second time subsequent to the first time, forming and transmitting from the TPM sensor a second message according to the adjusted periodicity, the adjusted content, and the adjusted length.

19. The non-transitory computer usable medium of claim 17, wherein the operational patterns relate to temperature patterns, wheel rotation patterns, gravity change patterns, and changes in power.

* * * * *